US010388010B2

United States Patent
Feng (10) Patent No.: US 10,388,010 B2
(45) Date of Patent: Aug. 20, 2019

(54) IMAGE ACQUIRING DEVICE AND METHOD OF CORRECTING COORDINATES THEREOF

(71) Applicants: HKC CORPORATION LIMITED, Shenzhen (CN); CHONGQING HKC OPTOELECTRONICS TECHNOLOGY CO., LTD., Chongqing (CN)

(72) Inventor: Hu Feng, Chongqing (CN)

(73) Assignees: HKC CORPORATION LIMITED, Shenzhen (CN); CHONGQING OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/745,067

(22) PCT Filed: Dec. 13, 2017

(86) PCT No.: PCT/CN2017/115872
§ 371 (c)(1),
(2) Date: Dec. 14, 2018

(87) PCT Pub. No.: WO2018/209936
PCT Pub. Date: Nov. 22, 2018

(65) Prior Publication Data
US 2019/0096054 A1 Mar. 28, 2019

(30) Foreign Application Priority Data
May 15, 2017 (CN) .......................... 2017 1 0338243

(51) Int. Cl.
*H04N 9/47* (2006.01)
*G06T 7/00* (2017.01)
(Continued)

(52) U.S. Cl.
CPC .......... *G06T 7/0004* (2013.01); *G06T 7/0008* (2013.01); *G06T 7/70* (2017.01);
(Continued)

(58) Field of Classification Search
CPC ....... G06T 7/0004; G06T 7/0008; G06T 7/70; G06T 2207/30108; G06T 2207/30121;
(Continued)

(56) References Cited

U.S. PATENT DOCUMENTS

| 2003/0179302 | A1* | 9/2003 | Harada | .................. H04N 5/361 |
| | | | | 348/231.6 |
| 2004/0126909 | A1* | 7/2004 | Obara | .................. G06T 7/0004 |
| | | | | 438/14 |

(Continued)

FOREIGN PATENT DOCUMENTS

| CN | 101587080 A | 11/2009 |
| CN | 102023161 A | 4/2011 |

(Continued)

OTHER PUBLICATIONS

International Search Report dated Feb. 26, 2018 for corresponding International Application No. PCT/CN2017/115872, filed Dec. 13, 2017.

*Primary Examiner* — Helen Shibru
(74) *Attorney, Agent, or Firm* — Law Offices of Albert Wai-Kit Chan, PLLC (57) ABSTRACT

The present application provides an image acquiring device and a method of correcting coordinates of the image acquiring device, wherein the method includes: detecting a coordinate of a defect detected in a process; initializing a position of a photographing device according to the coordinate of the defect detected in a preprocessing; then adjusting the position of the photographing device according to a position of the defect in the picture currently captured by the photo-
(Continued)

graphing device, so that the defect is located at the center of the picture currently captured by the photographing device; recording the coordinate of the defect at the center of the picture; and providing the coordinate of the defect at the center of the picture to a data management system.

19 Claims, 4 Drawing Sheets

(51) Int. Cl.
  *G06T 7/70* (2017.01)
  *H04N 5/232* (2006.01)
  *G09G 3/00* (2006.01)
(52) U.S. Cl.
  CPC ......... *G09G 3/006* (2013.01); *H04N 5/23229* (2013.01); *H04N 5/23299* (2018.08); *G06T 2207/30108* (2013.01); *G06T 2207/30121* (2013.01); *G06T 2207/30244* (2013.01)
(58) Field of Classification Search
  CPC .......... G06T 2207/30244; G09G 3/006; H04N 5/23229
  USPC ...................................... 386/92, 94
  See application file for complete search history.

(56) References Cited

U.S. PATENT DOCUMENTS

| | | | | |
|---|---|---|---|---|
| 2006/0078189 A1* | 4/2006 | Hosoya | ................. | G06K 9/033 382/149 |
| 2009/0222753 A1* | 9/2009 | Yamaguchi | ........... | G06T 7/0004 715/771 |
| 2012/0154675 A1* | 6/2012 | Nasu | ..................... | H04N 5/145 348/452 |
| 2015/0332452 A1* | 11/2015 | Tsuchiya | ............... | G06T 7/0004 382/147 |
| 2016/0358745 A1* | 12/2016 | Katou | .................. | G06T 7/0004 |
| 2018/0012349 A1* | 1/2018 | Sakai | ..................... | H01J 37/22 |

FOREIGN PATENT DOCUMENTS

| | | |
|---|---|---|
| CN | 102435629 A | 5/2012 |
| CN | 107040725 A | 8/2017 |
| JP | 2000340606 A | 12/2000 |
| JP | 2009281836 A | 12/2009 |
| KR | 20090121227 A | 11/2009 |
| TW | 201005282 A | 2/2010 |

* cited by examiner

FIG. 4

IMAGE ACQUIRING DEVICE AND METHOD OF CORRECTING COORDINATES THEREOF

FIELD OF THE INVENTION

The present application relates to the technical field of coordinate correction, and more particularly relates to an image acquiring device and a method of correcting coordinates of the image acquiring device.

BACKGROUND OF THE INVENTION

In a manufacturing process of a liquid crystal display panel, the liquid crystal display panel may be affected by a defect at a substrate itself or the defect introduced in the manufacturing process. An Automatic Optical Inspection (AOI) machine is usually adopted to detect a defect in a sample to be photographed based on optical principles. If the AOI machine detects the defect, it will record a coordinate of the defect and upload the coordinate of the defect to a Manufacturing Execution System (MES). After loading the sample to be photographed at a color film camera, the color film camera downloads the coordinate of the detect uploaded by the AOI machine from the MES, and then directly moves to the coordinate to photograph the defect. A photographed defective picture can be configured to analyze a defect in the manufacturing process and a yield. After an automatic repairing process of the subsequent processing reading the coordinate of the defect uploaded by the AOI machine, which moves to a position of the coordinate of the defect to search for the defect with a low magnification lens, and then switches to a high magnification lens to repair the defect.

However, a photographing and repairing process in the prior art has following problems. On one hand, if the color film camera moves to the position of the defect according to the coordinate of the defects uploaded by the AOI and takes a picture, the defect may not be at a center of visual field due to a mechanical error between the machines, in a serious situation, the defect even may not appear in the visual field, or the appearing defect may not be the defect recorded under the coordinate, so that it will affect a judgment of a category of the defect and an analysis of the yield. On the other hand, if the coordinate of the defect, which are read by the automatic repairing process and uploaded by the AOI machine, repairs the defect, because the defect may not beat the center of the visual field, the defect needs to be searched with the low magnification lens at first, and then the defect is repaired via the high magnification lens. Each sample to be repaired may have a plurality of defects, so the high and low magnification lenses may be switched back and forth, which may cause a low efficiency of a repair process, and increase equipment depreciation.

SUMMARY OF THE INVENTION

In view of this, the present application provides an image acquiring device and a method of correcting coordinates of the image acquiring device. So it can avoid coordinate offset caused by a mechanical error between different machines, and improve an efficiency of a subsequent repairing process of the defect and reduce equipment depreciation.

The present application provides a method of correcting coordinates of an image acquiring device. The method includes:

acquiring a defect in a sample to be photographed detected in a preprocessing and a first coordinate of the defect;

initializing a position of a photographing device according to the first coordinate of the defect, and acquiring a picture currently captured by the photographing device;

if the defect in the picture currently captured by the photographing device is not located at the center of the picture, adjusting the position of the photographing device according to a position of the defect in the picture currently captured by the photographing device until the defect in the picture currently captured by the photographing device is located at the center of the currently captured picture;

if the defect in the picture currently captured by the photographing device is located at the center of the currently captured picture, photographing the defect and recording a current coordinate of the defect as a second coordinate; and providing the second coordinate of the defect to a data management system, so that a subsequent processing locates the defect according to the second coordinate of the defect, and performs a corresponding operation to the defect.

The present application further provides a method of correcting coordinates of an image acquiring device. The method includes:

acquiring a defect in a sample to be photographed detected in a preprocessing and a first coordinate of the defect;

initializing a position of a photographing device according to the first coordinate of the defect, and acquiring a picture currently captured by the photographing device;

if the defect in the picture currently captured try the photographing device is not located at the center of the picture, adjusting the position of the photographing device according to a position of the defect in the picture currently captured by the photographing device until the defect in the picture currently captured by the photographing device is located at the center of the currently captured picture;

if the defect in the picture currently captured by the photographing device is located at the center of the currently captured picture, photographing the defect and recording a current coordinate of the defect as a second coordinate; and providing the second coordinate of the defect to a data management system, so that a subsequent processing locates the defect according to the second coordinate of the defect, and performs a corresponding operation to the defect;

calculating a coordinate offset according to the second coordinate of the defect and the first coordinate of the defect detected by the preprocessing, so that if photographing a defect in another positions of the sample to be photographed, the position of the photographing device is initialized according to the first coordinate of the defect in the another positions and the coordinate offset; and setting the calculated coordinate offset as the coordinate offset of the defect in the image acquiring device and the defect detected in the sample to be photographed, and of a preprocessing machine of the first coordinate of the defect, so that the second coordinate of all defects in the sample to be photographed of the same preprocessing machine is obtained according to the coordinate offset.

The present application further provides an image acquiring device. The image acquiring device includes:

a first coordinate acquiring module configured to acquire a defect in a sample to be photographed detected in a preprocessing and a first coordinate of the defect;

a photographing device initializing module configured to initialize a position of a photographing device according to the first coordinate of the defect, and acquire a picture currently captured by the photographing device;

a photographing device adjusting module configured to: if the defect in the picture currently captured by the photographing device is not located at the center of the picture, adjust the position of the photographing device according to a position of the defect in the picture currently captured by the photographing device, until the defect in the picture currently captured by the photographing device is located at the center of the currently captured picture;

a second coordinate acquiring module configured to photograph the defect and record a current coordinate of the defect as a second coordinate if the defect in the picture currently captured by the photographing device is located at the center of the currently captured picture; and an uploading module configured to provide the second coordinate of the defect to a data management system, so that a subsequent processing locates the defect according to the second coordinate of the defect, and performs a corresponding operation to the defect.

The present application further provides a computer storage medium. The computer storage medium may he non-volatile, a computer program is stored on thereof, and the computer program can realize the method provided by the above first aspect if it is read and executed by one or more processors.

In the present application, after acquiring a coordinate of a defect detected by a preprocessing; initializing a position of a photographing device according to the coordinate of the defect detected in the preprocessing at first, and then adjusting the position of the photographing device according to a position of the defect in the picture currently captured by the photographing device, so that the defect is located at the center of the picture currently captured by the photographing device; recording the coordinate of the defect at the center of the picture; and providing the coordinate of the defect at the center of the picture to a data management system. The method can avoid coordinate offset caused by a mechanical error between different machines, and can further provide a coordinate after being corrected for a subsequent processing, improve an efficiency of a subsequent repairing process of the defect, and reduce equipment depreciation in the subsequent processing. Moreover, the present application is convenient in operation, simple in implementation, wide in adaptability, and has strong feasibility and usability.

BRIEF DESCRIPTION OF THE DRAWINGS

In order to describe the technical solutions in the embodiments of the present application more clearly, accompanying drawings required for describing the embodiments or the prior art will be briefly introduces. Apparently, the accompanying drawings in the following description are merely the embodiments of the present application, and other drawings may be obtained by those skilled in the art according to these accompanying drawings without paying any creative labor.

DETAILED DESCRIPTION OF THE PREFERRED EMBODIMENT

The technical solutions in embodiments of the present application are clearly and completely described below with reference to the accompanying drawings in the embodiments of the present application. Apparently, the described embodiments are merely a part of the embodiments of the present application, but not all of the embodiments. All other embodiments obtained by those skilled in the art based on the embodiments of the present application without creative efforts shall fall within the protecting scope of the present application.

It should be understood that the term "comprise", which is used in specification and appended claims, indicates the presence of the stated feature, integer, step, operation, element, and/or component, but does not exclude the presence or addition of one or more other features, integers, steps, operations, elements, and/or components.

It should also be understood that the terms used herein in the specification of the present application are just only described a purpose in particular embodiments, and are not intended to limit the present application. As used in the specification and the appended claims, the singular forms "a", "an" and "the" include plural aspects unless the context clearly dictates otherwise.

It should further be understood that the term "and/or", which is used in the specification and the appended claims, indicates one or more any combinations and all possible combinations in associated listed items, and includes these combinations.

As used in the specification and the appended claims, the term "if" may be interpreted as "when" or "once" or "in response to a determination" or "in response to a detection" as the context. Similarly, the phrase "if it determines" or "if it detects [described condition or event.]" may be interpreted from the context to refer to "once it determines" or "in response to a determination" or "once it detecting the [described condition or event]" or "in response to the detecting [described condition or event]".

In order to illustrate the technical solutions described in the present application, the specific embodiments are described as following.

The embodiments of the present application can he used for a color film camera, and the color film camera is generally used for photographing a defect in a manufacturing process of a liquid crystal panel. One person skilled in the art should understand the color film camera of the embodiments of the present application in a broad sense. It should be not limited the color film camera in the prior art, which is named a photographing device. Any device that adopts the method described in the embodiments of the present application is within the protection scope of the present application.

Figure 1:
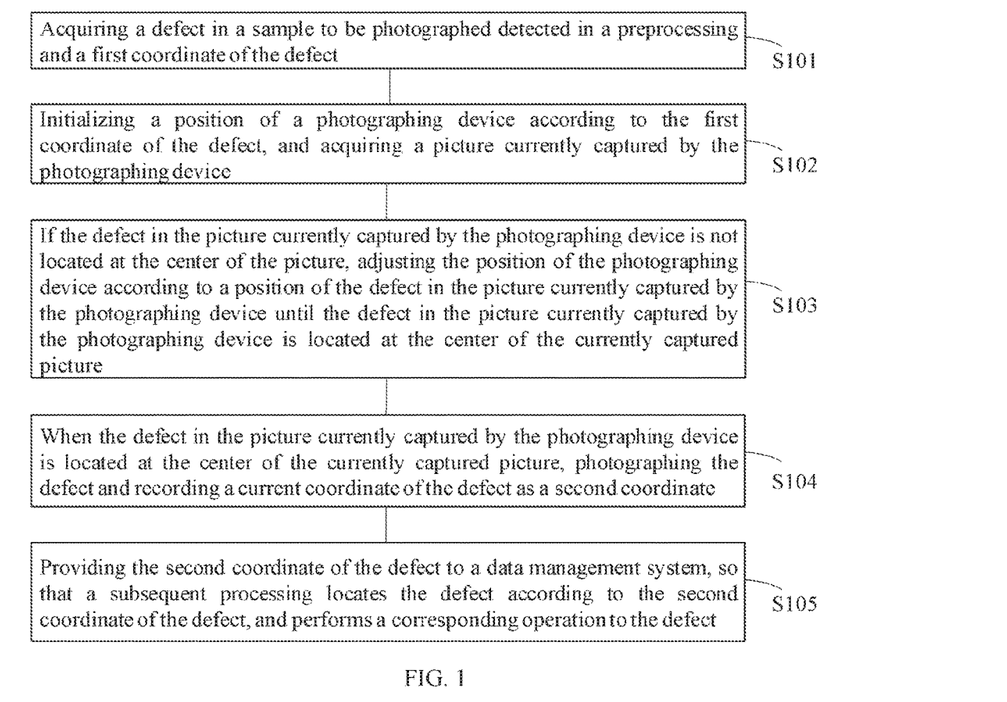
FIG. 1 is a schematic flow chart of a method of correcting coordinates of an image acquiring device provided by an embodiment of the present application.

Referring to FIG. 1, FIG. 1 is a schematic flow chart of a method of correcting coordinates of an image acquiring device provided by an embodiment of the present application. As shown in FIG. 1, the method may include the following steps:

a step S101, acquiring a detect in a sample to be photographed detected in a preprocessing and a first coordinate of the defect.

In an embodiment of the present application, the preprocessing means that a processing step is executed before taking a picture of the sample to be photographed, which usually refers to a processing step that the AIO machine detects a defect in the sample to be photographed. If the AIO machine detects the defect in the sample to be photographed, it may detect a plurality of defects in the sample to be photographed. At the same time, if the AIO machine detects the defects, it may acquire a first coordinate in the sample to be photographed. The defect refers to a position failing to reach a preset and eligible condition in the sample to he photographed. The preset and eligible condition refers to conditions set in advance and configured to determine normal and abnormal. For example, an example may be set as following: if a matching degree between a certain position in the sample to be photographed and a given sample is greater than a threshold value, it may be determined as normal; if the matching degree between the certain position in the sample to be photographed and the given sample is less than or equal to the threshold value, it may be determined that the position as defects. The corresponding coordinate of the position is the coordinate of the defect. The defect mainly refers to some flaws introduced in the manufacturing process of a liquid crystal panel. For example, particles are left on a substrate because the substrate is not cleaned completely; the glue is not cleaned completely in the manufacturing process causing a photo resist residue; abnormal graphics is introduced in the manufacturing process; and a surface defect is introduced via an epitaxial wafer in the process of crystal growth of the LED manufacturing process a step S102, initializing a position of a photographing device according to the first coordinate of the defect, and acquiring a picture currently captured by the photographing device.

In an embodiment of the present application, after placing the sample to be photographed on an objective table, a point represented by the coordinates (0, 0) of the sample to be photographed may be searched at first, and then drive the photographing device to a position of the first coordinate according to the first coordinate of the defect and the position of the current point (0,0). The objective table is usually movable, therefore, as another embodiment of the present application, a position of the photographing device may be secured, and the objective table can be moved to make the photographing device to be located at the position of the first coordinate. The photographing device ay be, but is not limited to, a Charge-coupled Device (CCD), or a camera.

Preferably, if the defect is located at the center of the picture currently captured by the photographing device, the defect may be photographed.

In an embodiment of the present application, it is also be required to consider that there is no mechanical error between different machines, and it is possible that the defect is located at the center of the picture currently captured by the photographing device, the defect may be photographed, so that there is no need to adjust the photographing device, and the defect can be photographed directly.

In a step S103, if the defect in the picture currently captured by the photographing device is not located at the center of the picture, adjusting the position of the photographing device according to a position of the defect in the picture currently captured by the photographing device until the defect in the picture currently captured by the photographing device is located at the center of the currently captured picture.

In an embodiment of the present application, if the AOI machine detects the defect in the sample to be photographed, the point (0, 0) of the sample to be photographed is usually determined firstly, and then the first coordinate (x, y) is determined according to a distance from the position of the defect to the point (0, 0).After loading the sample to be photographed at the color film camera, the point (0, 0) of the sample to be photographed is searched first, and then after finding the point (0, 0), the photographing device may move to the position of the defect according to the first coordinate (x, y) of the defect, and photograph the defect directly. However, because of the mechanical error, such as a mechanical error between the AOI machine detected the defect in the sample to he photographed and the color film camera currently photographing the sample to be photographed, it is possible that, after the photographing device has moved to the corresponding position according to the first coordinate (x, y) of the defect, the defect corresponding to the first coordinate does not appear in the center of the visual field of the photographing device. Even more serious case is that the defect corresponding to the first coordinate does not appear in the visual field of the photographing device. In this case, the position of the photographing device needs to be adjusted, and the position of the photographing device is adjusted according to the position of the defect in the picture currently captured by the photographing device until the defect is appeared at the center of the visual field of the photographing device.

In an alternative embodiment, the step that the position of the photographing device is adjusted according to the position of the defect in the picture currently captured by the photographing device until the defect is appeared at the center of the visual field of the photographing device includes:

calculating a displacement information of the photographing device according to the position of the defect in the picture currently captured by the photographing device;

adjusting a position of the photographing device according to the displacement information, and acquiring a picture currently captured by the photographing device after adjusting its the position;

identifying a position of the defect in the picture currently captured by the photographing device after adjusting its the position;

if the detect in the picture currently captured by the photographing device after adjusting its the position is not located at the center of the picture, the position of the photographing device may be continuously adjusted until the defect in the picture currently captured by the photographing device is located at the center of the picture currently captured by the photographing device;

if the defect in the picture currently captured by the photographing device after adjusting its position is located at the center of the picture, the defect may be photographed, and the current coordinate of the defect may be recorded as the second coordinate x', y').

In an embodiment of the present application, the defect in the picture captured by the photographing device after initializing the position ay not locate at the center of the picture. In this case, it is necessary to calculate a distance between the defect in the picture and the center of the picture (for example, the distance in both x and y directions).The displacement information of the photographing device is determined according to the distance in the picture. After performing the displacement information via the photographing device, the picture is currently captured by the photographing device. The position of the photographing device is adjusted based on the above manner until the defect in the picture captured by the photographing device is located at the center of the picture, and the coordinate of the defect located at the center of the picture is recorded based on the above manner So that the coordinate of the defect located at the center of the picture is represented here as the second coordinate, and the coordinate of the defect is acquired by a corresponding position of the photographing device.

In an alternative embodiment, if the defect in the picture currently captured by the photographing device is not located in the picture, it may respectively move up, down, left, and right in a preset distance according to the current coordinate of the photographing device. If the photographing device moves the preset distance in any direction, the defect may appear in the visual field of the photographing device, and the position of the photographing device may be adjusted according to the position of the defect in the picture currently captured by the photographing device.

In an embodiment of the present embodiment, because the defect may not appear in the visual field of the photographing device, the defect may not be continuously located and photographed in the visual field. If the photographing device aimlessly searches the defect, the searched defect may be not the defect corresponding to the first coordinate. In this case, some rules need to be set to continuously search for the defect all around the first coordinate. Thus, the defect is searched by moving up, down, left, and right in sequence for the preset distance at the position of the first coordinate. It should be noted that the up, down, left and right directions are only used to illustrate that the photographing device may search around the first coordinate according to a preset searching rule, and the defect may also be searched by moving up, down, left, and right in sequence for the preset distance. A movement sequence for different orientations can also be adjusted accordingly. If the searched defect in the round orientations is more than one, it may indicate that the defect corresponding to the coordinate may not be searched accurately according to the coordinate of the defect. Thus, the first coordinate of a next defect may be photographed, and an offset of the coordinate may be acquired according to the first coordinate of the next defect and a position of the next defect of an actual defect.

In a step S104, if the defect in the picture currently captured by the photographing device is located at the center of the currently captured picture, photographing the defect and recording a current coordinate of the defect as a second coordinate.

In an embodiment of the present application, if the defect is located at the center of the visual field of the photographing device after adjusting the position of the photographing device, the defect may be photographed. After moving the photographing device, the position of the photographing device ensures that the defect is located at the center of the visual field of the photographing device, but the position of the photographing device is not already at the position of the first coordinate corresponding to the defect. Therefore, the coordinate of the defect needs to be reconfirmed as the second coordinate (x', y').

In a step S105, providing the second coordinate of the defect to a data management system, so that a subsequent processing locates the defect according to the second coordinate of the defect, and performs a corresponding operation to the defect.

In an embodiment of the present application, an updated second coordinate (x', y') of the defect may be provided to the data management system. The data management system ay be a MES system, or a system capable of storing and processing coordinate data. If other processing sites treat the defect in the sample to be photographed, an updated coordinate of the defect in the sample to be photographed may be directly acquired from the EMS system. For example, according to a step of repairing the defect in the subsequent processing, because a low magnification lens may see a wider visual field and a high magnification lens may see a narrower visual field, in the repairing process, the low magnification lens may be usually used for searching the first, then may be adjusted to a position where the defect can be seen under the high magnification lens, and then the high magnification lens may be switched to perform the repairing process. If the subsequent processing acquires the second coordinate of the updated defect, the defect may be repaired directly under the high magnification lens according to the updated second coordinate, and the low magnification lens may not be used to search the defect, so that the efficiency of the subsequent processing is improved, and mechanical wear caused by switching back and forth the lens is reduced.

Preferably, the step of providing the second coordinate (x', y') to the data management system includes:

updating the first coordinate (x, y) of the defect in the sample to be photographed in the preprocessing to the second coordinate (x', y'), and providing the second coordinate (x', y') of the updated defect to the data management system;

alternatively, providing the second coordinate (x', y') of the defect to the data management system, so that the first coordinate (x, y) of the defect in the sample to be photographed in the preprocessing is updated to the second coordinate (x', y') via the data management system.

In an embodiment of the present application, the first coordinate (x, y) of the defect in the sample to be photographed in the preprocessing may be updated to the second coordinate (x', y') after adjusting the mechanical error, and then be provided to the data management system. In addition, the second coordinate (x', y') after adjusting the mechanical error may be provided to the data management system, and then the first coordinate (x, y) of the defect in the sample to be photographed in the preprocessing may be updated to the second coordinate (x', y') via the data management system, or the data management system may directly acquire the second coordinate (x', y') after adjusting the mechanical error if the subsequent processing acquires the coordinate of the defect.

In an alternative embodiment, if the defect in the picture currently captured by the photographing device is detected at the center of the picture, after photographing the defect, and recording the current coordinate of the defect to the second coordinate (x', y'), the step further includes:

calculating a coordinate offset according to the second coordinate (x', y') of the defect and the first coordinate (x, y) of the defect detected by the preprocessing, so that if photographing a defect in another positions of the sample to be photographed, and the position of the photographing device is initialized according to the first coordinate of the defect at the another positions and the coordinate offset.

In an embodiment of the present application, because mechanical error between the two machines is basically constant, difference between the two coordinates of the defect can e taken as the coordinate offset, and the coordinate offset can be taken as the mechanical error between the two machines. Generally, the sample to be photographed may have a plurality of the defects, so that if other defects in the sample to be photographed take a picture, the second coordinate (x', y') of the other defects may be acquired according the first coordinate (x, y) of the other defect and the mechanical error. If the photographing device is initialized, the position of the photograph device is initialized directly according to the second coordinate (x', y'), so that the photographing device can be avoided from moving back and forth to make the defect to be located at the center of the visual field of the photographing device. Therefore, it can improve a photographing efficiency, and thereby reduce the mechanical wear.

In an alternative embodiment, a corresponding relationship between the defect in the detected sample to be photographed and the image acquiring device (such as the color film camera) and the coordinate offset of a preprocessing machine of the first coordinate of the defect is generated.

In an embodiment of the present application, the calculated coordinate offset can be set as the corresponding relationship between the defect in the detected sample to be photographed and the image acquiring device (such as the color film camera) and the coordinate offset of the preprocessing machine of the first coordinate of the defect. Because a factory in a certain process maybe usually equipped with a plurality of the same machines, such as, a plurality of the AOI machines and color film cameras, each of the AOI machines and each of the color film cameras are provided with a number. After loading the sample to be photographed at the color film camera, the defect in the sample to be photographed and detected in the preprocessing and the first coordinate (x, y) of the defect are acquired, and the number of the preprocessing machine for detecting the defect in the sample to be photographed and the first coordinate (x., y) of the defect. The coordinate offset may be directly acquired according to the generated corresponding relationship between the defect in the color film camera and the detected sample to be photographed and the coordinate offset of the preprocessing machine of the first coordinate (x, y) of the defect. Therefore, the second coordinate (x', y') of all defects in the sample to be photographed may be acquired according to the coordinate offset, and the position of the photographing device may be initialized directly according to the second coordinate (x', y') of the defect. Therefore, it can improve a photographing efficiency, and thereby reduce the mechanical wear.

It should be understood that, in the above embodiments, numerical values of sequence numbers of each steps does not mean that a sequence of execution priorities. The execution order of each of the steps should be determined by its function and inherent logic, and should not limit any implementation of the embodiments of the present application.

Figure 2:
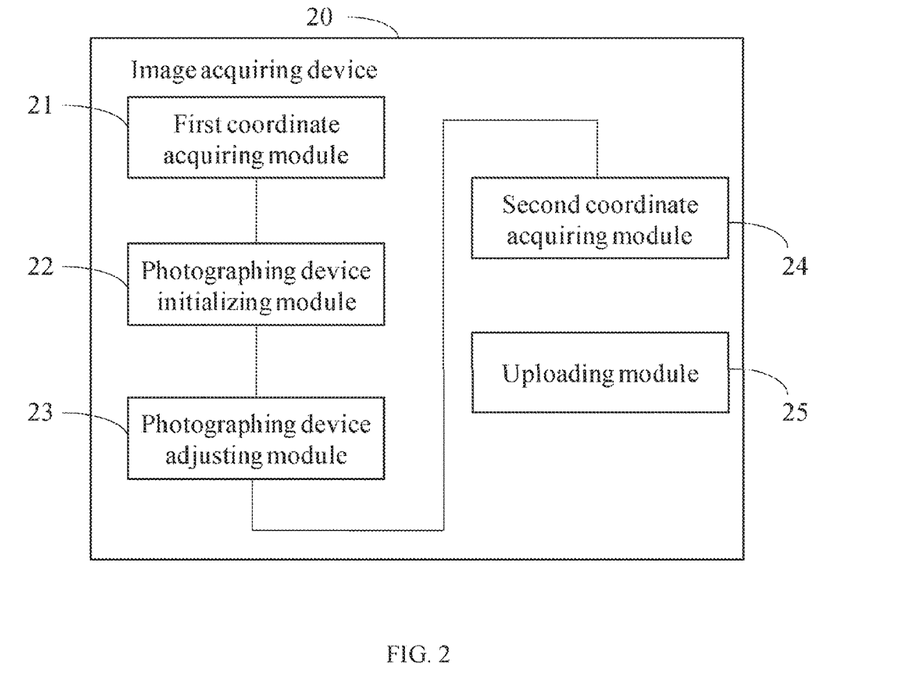
FIG. 2 is a schematic block diagram of an image acquiring device provided by one embodiment of the present application.

Referring to FIG. 2, FIG. 2 is a schematic block diagram of an image acquiring device provided by one embodiment of the present application. For illustration purpose, only a part related to the embodiment of the present application are shown.

An image acquiring device 20 may be a software unit, a hardware unit, or a unit combined the software with the hardware built in a terminal device (a conventional image acquiring device, a color film camera, the color film camera coupled to a computer, or the like), or may be as an independent pendant, which is integrated into the terminal device.

The image acquiring device 20 includes:
a first coordinate acquiring module 21 configured to acquire a defect in a sample to be photographed detected in a preprocessing and a first coordinate of the defect;
a photographing device initializing module 22 configured to initialize a position of a photographing device according to the first coordinate of the defect, and acquire a picture currently captured by the photographing device;

a photographing device adjusting module 23 configured to: if the defect in the picture currently captured by the photographing device is not located at the center of the picture, adjust the position of the photographing device according to a position of the defect in the picture currently captured by the photographing device until the defect in the picture currently captured by the photographing device is located at the center of the currently captured picture;
a second coordinate acquiring module 24 configured to: if the defect in the picture currently captured by the photographing device is located at the center of the currently captured picture, photograph the defect and record a current coordinate of the defect as a second coordinate; and
an uploading module 25 configured to provide the second coordinate of the defect to a data management system, so that a subsequent processing locates the defect according to the second coordinate of the defect, and performs a corresponding operation to the defect.

Figure 3:
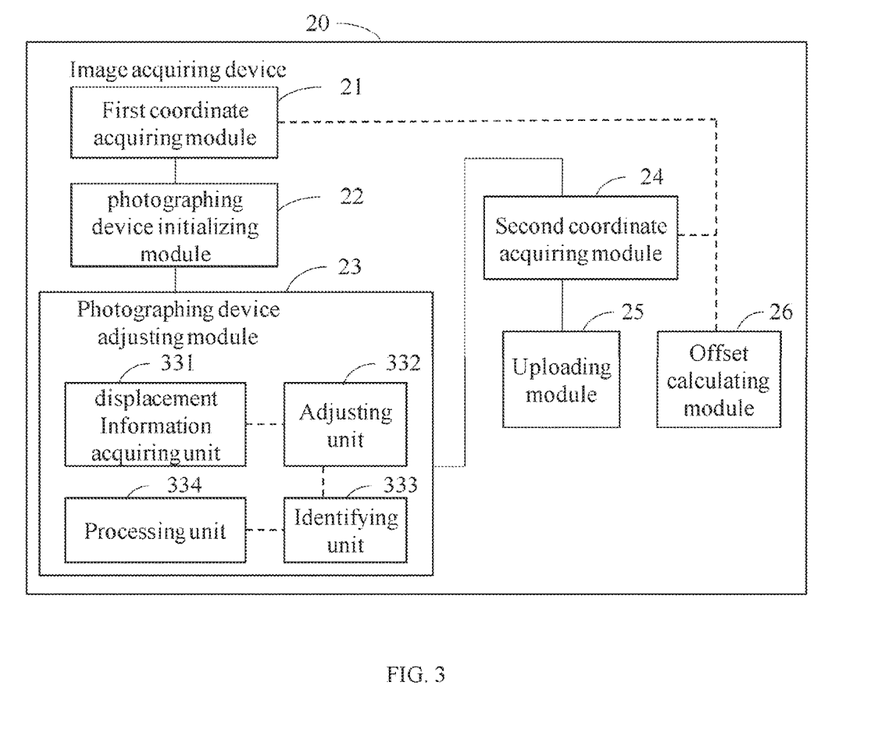
FIG. 3 is a schematic block diagram of an image acquiring device provided by another embodiment of the present application.

Referring to FIG. 3, FIG. 3 is a schematic block diagram of an image acquiring device provided by another embodiment of the present application. The image acquiring device newly increases the following modules based on the above image acquiring device 20.

Preferably, the photographing device adjusting module 23 includes:
a displacement information acquiring unit 331 configured to calculate a displacement information of the photographing device according to the position of the defect in the picture currently captured by the photographing device;
an adjusting unit 332 configured to adjust the position of the photographing device according to displacement information, and acquire the picture currently captured by the photographing device after adjusting the position;
an identifying unit 333 configured to identify the position of the defect in the picture currently captured by the photographing device after adjusting the position; and
a processing unit 334 configured to: if the defect in the picture currently captured by the photographing device after adjusting the position is not located at the center of the picture, adjust the position of the photographing device until the defect in the picture currently captured by the photographing device is located at the center of the currently captured picture.

The processing unit 334 is further configured to: if the defect in the picture currently captured by the photographing device after adjusting the position is located at the center of the picture, photograph the defect and record the current coordinate of the defect as the second coordinate.

Preferably, the image acquiring device 20 further includes:
an offset calculating module 36 configured to calculate a coordinate offset according to the second coordinate (x, y) of the defect and the first coordinate of the defect detected by the preprocessing, so that if photographing a defect in another positions of the sample to be photographed, the position of the photographing device is initialized according to the first coordinate of the defect at the another positions and the coordinate offset.

It should be understood that, for the convenience and simplicity of the illustration, a division of the above functional units and modules is described via a manner of the example. In a specific application, the above functions allocation may be performed by different functional units and modules as required, that is, internal structures of the image acquiring device may be divided into different functional units or modules to accomplish all or part of the functions described above. Each of the functional units or modules in the embodiments may be integrated in one processing unit, each unit may be present alone, or two or more units may be integrated into one processing unit. The integrated units or modules can be implemented in a manner of a functional unit of hardware or a functional unit of the software. In addition, a specific name of each of the functional units and modules is merely for distinguishing each other more, convenient, and is not intended to limit the scope of protection of the present application. Specific operating processes of the units and modules in the image acquiring device may reference the corresponding processes in the foregoing method of the embodiments, and the details are not described herein again.

Figure 4:
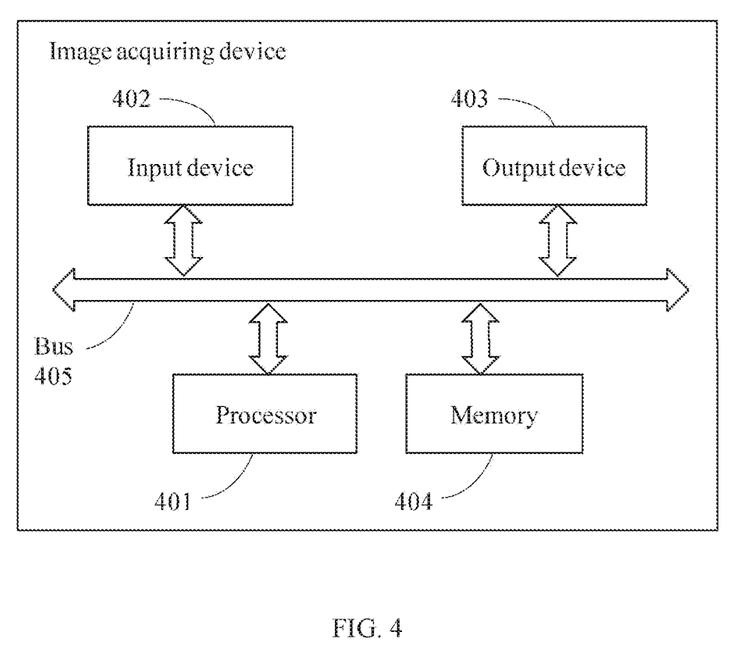
FIG. 4 is a schematic block diagram of further an image acquiring device provided by yet another embodiment of the present application.

FIG. 4 is a schematic block diagram of further another image acquiring device provided by an embodiment of the present application. As shown in FIG. 4, the image acquiring device may include: one or more processors 401 (only one shown in FIG. 4), one or more input devices 402 (only one shown in FIG. 4), one or more output devices 403 (only one shown in FIG. 4), and a memory 404. The processors 401, the input devices 402, the output devices 403, and the memory 404 are coupled via a bus 405. The memory 404 may be configured to save an instruction, and the processor 401 may be configured to execute the instruction.

The processor 401 is configured to acquire a defect in a sample to be photographed and detected in a preprocessing and a first coordinate of the defect. The processor 401 is further configured to initialize a position of a photographing device according to the first coordinate of the defect, and a picture currently captured by the photographing device is acquired via the input device 402. The processor 401 is further configured to adjust the position of the photographing device according to the position of the defect in the picture currently captured by the photographing device until that the defect in the picture currently captured by the photographing device is located at the center of the currently captured picture, if the defect in the picture currently captured by the photographing device does not locate at the center of the currently captured picture. The processor 401 is further configured to photograph the defect and record the coordinate of the current defect as a second coordinate, if the detected defect in the picture currently captured by the photographing device is located at the center of the currently captured picture. The processor 401 is further configured to provide the second coordinate to a data management system via the output device 403, so that it may be convenient for a subsequent processing to locate according to the second coordinate of the defect, and to perform the corresponding operation to the defect.

Preferably, the processor 401 is further configured to calculate displacement information of the photographing device according to a position of the defect in the picture currently captured by the photographing device. The processor 401 is further configured to adjust the position of the photographing device according to the displacement information, and a picture currently captured by the photographing device after adjusting the position is acquired via the input device 402. The processor 401 is further configured to identify a position of the defect in the picture currently captured by the photographing device after adjusting the position. The processor 401 is further configured to continuously adjust the position of the photographing device, until that the defect in the picture currently captured by the photographing device is located at the center of the currently captured picture, if the defect in the picture currently captured by the photographing device after adjusting the position is not located at the center of the currently captured picture. The processor 401 is further configured to photograph the defect and record the current coordinate of the defect as a second coordinate, if the detected defect in the picture currently captured by the photographing device after adjusting the position is located at the center of the currently captured picture.

Preferably, the processor 401 is further configured to update the first coordinate of the defect in the sample to be photographed and detected in the preprocessing, and the second coordinate of the updated defect is provided to the data management system via the output device 403. The processor 401 is further configured to provide the second coordinate of the defect to the data management system via the output device 403, so that the data management system may update the first coordinate of the defect detected in the preprocessing to the second coordinate.

Preferably, the processor 401 is further configured to calculate a coordinate offset according to the second coordinate of the defect and the first coordinate of the defect detected in the preprocessing, so that if photographing a defect in another positions of the sample to be photographed, the position of the photographing device may be initialized according to the first coordinate of the defect at the another positions and the coordinate offset.

Preferably, the processor 401 is further configured to photograph the defect, if the defect in the picture currently captured by the photographing device is located at the center of the picture.

The memory 404 is configured to store data information required by a software program, a module, a unit, and an image acquiring device. The processor 401 executes various functions and data processing by running a software program, a module and a unit stored in the memory 404, so that the coordinate offset caused by the mechanical error between different machines can be avoided, and the equipment loss can be reduced.

It should be understood that, in an embodiment of the present application, the processor 401 may be a Central Processing Unit (CPU). The processor 401 may also be another universal processor, a digital signal processor (DSP), an Application Specific Integrated Circuits (ASICs), a Field-Programmable Gate Array (FPGA), other programmable logic element, a discrete gate or a transistor logic element discrete hardware components, and the like. The universal processor may be a microprocessor, and the processor may also be any conventional processor or the like.

The input device 402 may include a touchpad, a fingerprint acquisition sensor (for acquiring a user's fingerprint information and direction information of the fingerprint), a microphone, a CCD a data acquisition device, a data reception device, and the like. The output device 403 may include a display (LCD, etc.), a speaker, a data sending device, and the like.

The memory 404 may include a read-only memory and a random access memory, which provides the instruction and data to the processor 401. A portion of the memory 404 may also include non-volatile random access memory. For example, the memory 404 may also store type information of a device.

In a specific implementation, the processor 401, the input device 402, the output device 403 and the memory 404 described in the embodiments of the present application may perform an implementing manner described in the embodiment of the method for correcting a coordinate of an image acquiring device, and the implementation described in the embodiment of the image acquisition device may also be performed, which is not described herein again.

One of ordinary skill in the art may be aware that in combination with the modules and algorithm steps described in the embodiments of present application disclosed herein, which may be implemented by electronic hardware, computer software, or a combination thereof. In order to illustrate the interchangeability between the hardware and the software more clear, the composition and the steps of the embodiments have been generally described in terms of their functions in the above description. Whether these functions are implemented by the hardware or the software, it may depend on a specific application and a design constraint of the technical solutions. One person who skilled in the art may use different methods to implement the described functions for each particular application, but such implementation should not be considered as beyond the scope of the present application.

In the embodiments provided in the present application, it should be understood that, the disclosed image acquiring device and the method may be implemented in other manners. For example, the above-described embodiments are merely exemplary. For example, the division of modules or units is merely a logical function division, and may be other division in actual implementation. For example, a plurality of units or components may be combined or be integrated into another system, or some of the features can be ignored or not executed. In addition, the mutual or direct coupling, or communication connection shown or discussed may be indirectly coupled or connected via some interfaces, and devices or units may be coupled or connected by a manner of electrical, mechanical or other forms.

A unit described as a separate component may or may not be physically separated, and a component as a displayed unit may or may not be a physical unit, that is, which may locate at one place or be distributed to a plurality of network units. Some or all of the units may be selected as an actual need to achieve the purpose of the solutions in the embodiments.

In addition, each of the function modules in each embodiment of the present application may be integrated in one processing unit, each of the units may be present alone, or two or more units may be integrated in one unit. The above integrated unit can be implemented in a manner of the hardware-functional unit or software-functional unit.

If the integrated unit is implemented in a manner of a software-functional unit and is sold or used as an independent product, the integrated unit may be stored in a computer-readable storage medium. Based on such understanding, the technical solutions in nature of the embodiments of the present application, a part of the technical solutions, which are contributed to the prior art, or all parts of the technical solutions, which may be implemented in a manner of a software product. The computer software product may be stored in a storage medium, which includes a plurality of instructions configured to make a computer device (which may he a personal computer, a server, or a network device, etc.) or a processor to execute all or part of the steps of the methods described in the embodiments of the present application. The foregoing storage medium may include various mediums capable of storing program code, such as a USB, a removable hard disk, a read-only memory (ROM), a random access memory (RAM), a magnetic disk, or an optical disk.

The aforementioned embodiments are only preferred embodiments of the present application, and are not used for limiting the present application. Any modification, equivalent replacement, improvement, and so on, which are made within the spirit and the principle of the present application, should be included in the protection scope of the present application.

What is claimed is:

1. A method of correcting coordinates of an image acquiring device, comprising:

acquiring a defect in a sample to be photographed detected in a preprocessing and a first coordinate of the defect;

initializing a position of a photographing device according to the first coordinate of the defect, and acquiring a picture currently captured by the photographing device;

if the defect in the picture currently captured by the photographing device is not located at the center of the picture, adjusting the position of the photographing device according to a position of the defect in the picture currently captured by the photographing device until the defect in the picture currently captured by the photographing device is located at the center of the currently captured picture;

if the defect in the picture currently captured by the photographing device is located at the center of the currently captured picture, photographing the defect and recording a current coordinate of the defect as a second coordinate; and providing the second coordinate of the defect to a data management system, so that a subsequent processing locates the defect according to the second coordinate of the defect, and performs a corresponding operation to the defect.

2. The method of claim 1, wherein the step of adjusting the position of the photographing device according to the position of the defect in the picture currently captured by the photographing device until the defect in the picture currently captured by the photographing device is located at the center of the currently captured picture comprises:

calculating a displacement information of the photographing device according to the position of the defect in the picture currently captured by the photographing device;

adjusting the position of the photographing device according to displacement information, and acquiring the picture currently captured by the photographing device after adjusting the position;

identifying the position of the defect in the picture currently captured by the photographing device after adjusting the position;

if the defect in the picture currently captured by the photographing device after adjusting the position is not located at the center of the picture, adjusting the position of the photographing device until the defect in the picture currently captured by the photographing device is located at the center of the currently captured picture;

if the defect in the picture currently captured by the photographing device after adjusting the position is located at the center of the picture, photographing the defect and recording the current coordinate of the defect as the second coordinate.

3. The method of claim 1, wherein the step of providing the second coordinate of the defect to the data management system comprises:

updating the first coordinate of the defect in the sample to be photographed detected in the preprocessing as the second coordinate, and providing the second coordinate of the defect after being updated to the data management system.

4. The method of claim 1, wherein the step of providing the second coordinate of the defect to the data management system comprises:
providing the second coordinate of the defect to the data management system, so that the data management system updates the first coordinate of the defect detected by the preprocessing as the second coordinate.

5. The method of claim 1, wherein, after the step of photographing the defect and recording the current coordinate of the defect as the second coordinate if the defect in the picture currently captured by the photographing device after adjusting the position is located at the center of the picture, the method further comprises:
calculating a coordinate offset according to the second coordinate of the defect and the first coordinate of the defect detected by the preprocessing, so that if photographing a defect in another position of the sample to be photographed, the position of the photographing device is initialized according to the first coordinate of the defect at the another position and the coordinate offset.

6. The method of claim 5, wherein after the step of initializing the position of the photographing device according to the first coordinate of the defect at the another positions and the coordinate offset, the method further comprises:
setting the calculated coordinate offset as the coordinate offset of the defect in the image acquiring device and the defect detected in the sample to be photographed, and of a preprocessing machine of the first coordinate of the defect, so that the second coordinates of all defects in the sample to be photographed within the same preprocessing machine is acquired according to the coordinate offset.

7. The method of claim 1, wherein after the step of initializing the position of the photographing device according to the first coordinate of the defect, and acquiring the picture currently captured by the photographing device, the method further comprises:
photographing the defect if the defect in the picture currently captured by the photographing device is located at the center of the picture.

8. The method of claim 1, wherein after the step of initializing the position of the photographing device according to the first coordinate of the defect, and acquiring the picture currently captured by the photographing device, the method further comprises:
moving a preset distance according to current coordinate of the photographing device, if no defect is located in the picture currently captured by the photographing device; and
if the defect appears in a visual field of the photographing device after the photographing device moving the preset distance in any one direction, adjusting the position of the photographing device according to the position of the defect in the picture currently captured by the photographing device.

9. The method of claim 8, wherein the step of moving the preset distance according to the current coordinate of the photographing device comprises:
moving up, down, left, and right in sequence for the preset distance according to the current coordinate of the photographing device.

10. A method of correcting coordinates of an image acquiring device, comprising:
acquiring a defect in a sample to be photographed detected in a preprocessing and a first coordinate of the defect;
initializing a position of a photographing device according to the first coordinate of the defect, and acquiring a picture currently captured by the photographing device;
if the defect in the picture currently captured by the photographing device is not located at the center of the picture, adjusting the position of the photographing device according to a position of the defect in the picture currently captured by the photographing device until the defect in the picture currently captured by the photographing device is located at the center of the currently captured picture;
if the defect in the picture currently captured by the photographing device is located at the center of the currently captured picture, photographing the defect and recording a current coordinate of the defect as a second coordinate; and
providing the second coordinate of the defect to a data management system, so that a subsequent processing locates the defect according to the second coordinate of the defect, and performs a corresponding operation to the defect.
calculating a coordinate offset according to the second coordinate of the defect and the first coordinate of the defect detected by the preprocessing, so that if photographing a defect in another positions of the sample to be photographed, the position of the photographing device is initialized according to the first coordinate of the defect at the another positions and the coordinate offset; and
setting the calculated coordinate offset as the coordinate offset of the defect in the image acquiring device and the defect detected in the sample to be photographed, and of a preprocessing machine of the first coordinate of the defect, so that the second coordinate of all defects in the sample to be photographed of the same preprocessing machine is obtained according to the coordinate offset.

11. An image acquiring device, comprising: a memory, a processor, and the following program modules stored in memory and run on the processor:
a first coordinate acquiring module configured to acquire a defect in a sample to be photographed detected in a preprocessing and a first coordinate of the defect;
a photographing device initializing module configured to initialize a position of a photographing device according to the first coordinate of the defect, and acquire a picture currently captured by the photographing device;
a photographing device adjusting module configured to: if the defect in the picture currently captured by the photographing device is not located at the center of the picture, adjust the position of the photographing device according to a position of the defect in the picture currently captured by the photographing device until the defect in the picture currently captured by the photographing device is located at the center of the currently captured picture;
a second coordinate acquiring module configured to: if the defect in the picture currently captured by the photographing device is located at the center of the currently captured picture, photograph the defect and record a current coordinate of the defect as a second coordinate; and an uploading module configured to provide the second coordinate of the defect to a data management system, so that a subsequent processing locates the defect according to the second coordinate of the defect, and performs a corresponding operation to the defect.

12. The image acquiring device of claim 11, wherein a photographing device adjusting module comprises:

a displacement information acquiring unit configured to calculate a displacement information of the photographing device according to the position of the defect in the picture currently captured by the photographing device;

an adjusting unit configured to adjust the position of the photographing device according to displacement information, and acquire the picture currently captured by the photographing device after adjusting the position;

an identifying unit configured to identify the position of the defect in the picture currently captured by the photographing device after adjusting the position; and a processing unit configured to: if the defect in the picture currently captured by the photographing device after adjusting the position is not located at the center of the picture, adjust the position of the photographing device until the defect in the picture currently captured by the photographing device is located at the center of the currently captured picture;

wherein the processing unit is further configured to: if the defect in the picture currently captured by the photographing device after adjusting the position is located at the center of the picture, photograph the defect and record the current coordinate of the defect as the second coordinate.

13. The image acquiring device of claim 11, wherein the uploading module is specifically configured to update the first coordinate of the defect in the sample to be photographed detected in the preprocessing to the second coordinate, and to provide the second coordinate of the defect after being updated to the data management system.

14. The image acquiring device of claim 11, wherein the uploading module is specifically configured to provide the second coordinate of the defect to the data management system, so that the data management system updates the first coordinate of the defect detected by the preprocessing to the second coordinate.

15. The image acquiring device of claim 11, further comprising:

an offset calculating module configured to calculate a coordinate offset according to the second coordinate of the defect and the first coordinate of the defect detected by the preprocessing, so that if photographing a defect in another positions of the sample to be photographed, the position of the photographing device is initialized according to the first coordinate at the another positions of the defect and the coordinate offset.

16. The image acquiring device of claim 15, further comprising:

a machine coordinate offset setting module configured to set the calculated coordinate offset as the coordinate offset of the defect in the image acquiring device and the defect detected in the sample to be photographed, and of a preprocessing machine of the first coordinate of the defect, so that the second coordinate of all defects in the sample to be photographed of the same preprocessing machine is obtained according to the coordinate offset.

17. The image acquiring device of claim 11, further comprising:

a photographing module configured to photograph the defect if the defect in the picture currently captured by the photographing device is located at the center of the picture, after initializing the position of the photographing device according to a coordinate of the defect and acquiring a picture currently captured by the photographing device.

18. The image acquiring device of claim 11, further comprising:

A moving module configured to move a preset distance according to current coordinate of the photographing device, if the defect in the picture currently captured by the photographing device is not located in the picture; and a photographing device adjusting module configured to: if the defect appears in a visual field of the photographing device after the photographing device moving the preset distance in any one direction, adjust the position of the photographing device according to the position of the defect in the picture currently captured by the photographing device.

19. The image acquiring device of claim 18, wherein the moving module is specifically configured to move up, down, left, and right in sequence for the preset distance according to the current coordinate of the photographing device.

* * * * *

UNITED STATES PATENT AND TRADEMARK OFFICE
CERTIFICATE OF CORRECTION

| | |
|---|---|
| PATENT NO. | : 10,388,010 B2 |
| APPLICATION NO. | : 15/745067 |
| DATED | : August 20, 2019 |
| INVENTOR(S) | : Hu Feng |

Page 1 of 1

It is certified that error appears in the above-identified patent and that said Letters Patent is hereby corrected as shown below:

On the Title Page

Item (73) Assignees: second named Assignee should be corrected as "CHONGQING HKC OPTOELECTRONICS TECHNOLOGY CO., LTD."

Item (30) Foreign Application Priority Data should be corrected as "May 15, 2017 (CN) ...... 2017 1 0338243.X"

Signed and Sealed this
First Day of October, 2019

Andrei Iancu
*Director of the United States Patent and Trademark Office*